July 20, 1943.  D. B. PERRY  2,324,640
CHAIN
Filed Jan. 19, 1942  2 Sheets-Sheet 1
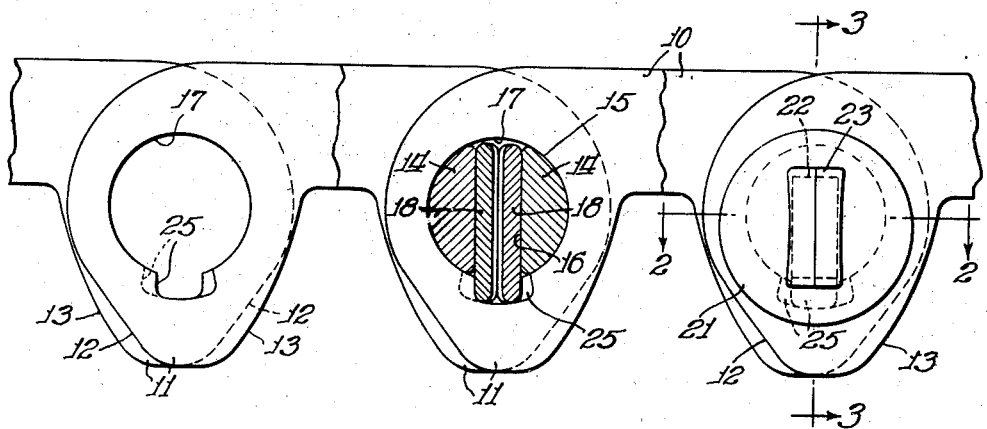
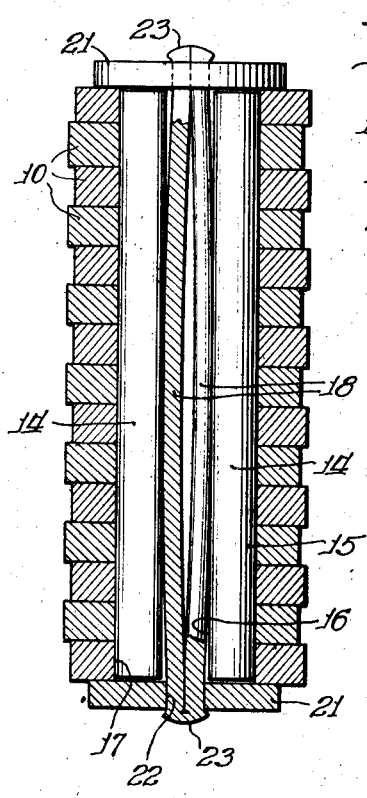
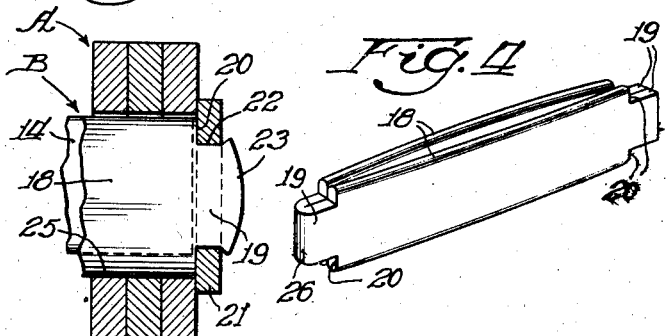
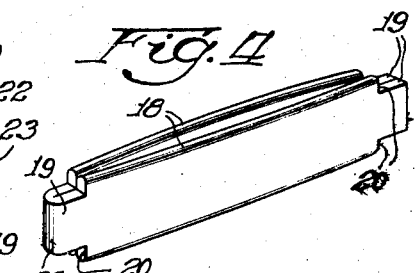
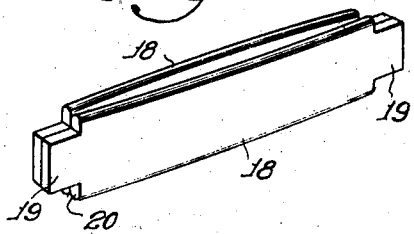
Inventor:
David B. Perry
By:
Edward C. Fitzhugh
Atty.

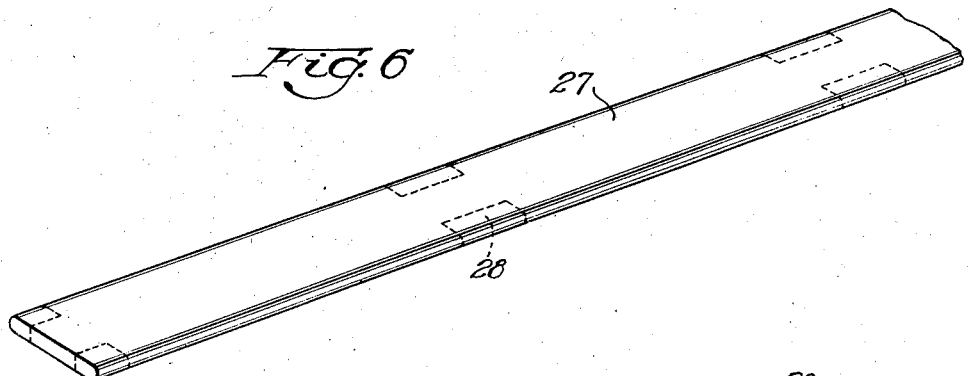
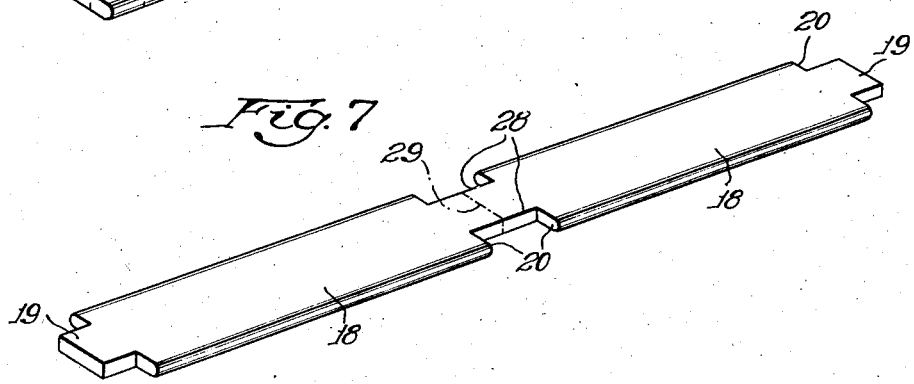
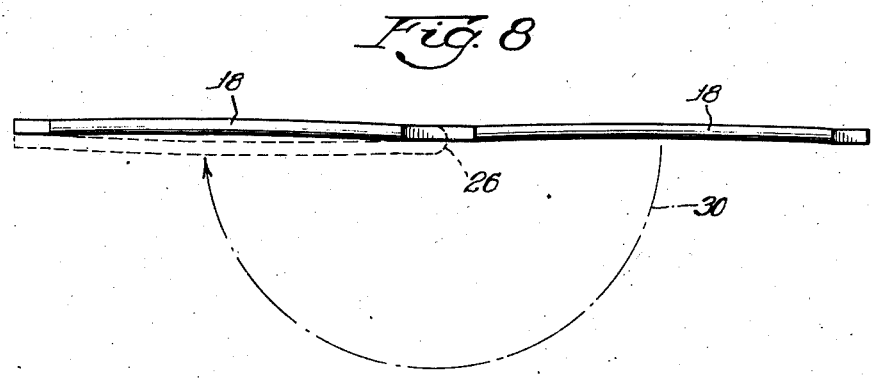

Patented July 20, 1943

2,324,640

UNITED STATES PATENT OFFICE 2,324,640

CHAIN

David B. Perry, Ithaca, N. Y., assignor to Morse Chain Company, Ithaca, N. Y., a corporation of New York Application January 19, 1942, Serial No. 427,273

7 Claims. (Cl. 74—256)

This invention relates to drive chains of the toothed belt type, commonly known as "silent chain" and has as its object to provide a chain of this type in which the joints of the chain are provided with improved means for suppressing whipping of the chain and compensating for wear.

When a chain is new and of the correct pitch, it usually runs quite satisfactorily, but as soon as any elongation in pitch takes place, there is accumulation of slack which is transferred to the slack side of the chain. This permits the chain to develop a whipping action when set in motion by impulses transmitted to the chain from the sprockets. This condition is particularly prevalent in motor vehicle cam shaft drives, and hence torsional vibration, originated in the crank shaft or in the cam shaft, may be amplified in the chain, producing the aforementioned whipping action which results in disagreeable noise and rapid destruction of the chain.

The compensating type of chain joint provides a yielding take-up in the joint which shortens the pitch of the chain on the slack side and permits the pitch to elongate as the chain is wrapped around the sprockets and pulled between them on the tension side. Chains having such compensating joints are at present available, but have certain disadvantages which the present invention aims to eliminate. In my prior Patents Nos. 2,067,243 and 2,096,061, I have disclosed compensating chain joints in which a pintle comprising a section or a plurality of sections of fragmental cross-sectional shape, is maintained in yielding varying engagement with cooperating bearing surfaces of the chain links, by a single bowed spring element. In a compensating type of chain which is available on the market, a pintle pin is embraced by a pair of resilient bushing sections which are normally bowed apart at their ends and are straightened out by tension in the chain. Such prior devices have the disadvantage of providing a limited area of varying contact between the pintle and the chain links. They have the further disadvantage of having the end regions of the spring elements in engagement with surfaces against which they must move longitudinally as the spring elements are flexed and unflexed. Since each spring element goes through at least one complete cycle of flexing in each circuit around the sprockets, the element of wear between the ends of the spring elements and their cooperating surfaces is a substantial one.

The present invention has as two of its major objects to provide a compensating type of chain joint having an increased pintle bearing surface.

Another object of the invention is to provide a compensating type of chain joint in which wear between the spring elements and the surfaces against which they bear is substantially completely eliminated. This is accomplished by arranging the spring elements so that they have a rolling or rocking instead of a sliding action on the surfaces against which they bear.

Another object of the invention is to provide a chain having a compensating type of joint in which the spring elements are adapted to perform the additional function of providing positive stop means to limit the backward flexing of the chain, while permitting the normal forward flexing required for wrapping the chain around the sprockets.

Another object of the invention is to provide a chain in which the compensating spring elements are arranged to act against the adjoining links in such a manner as to yieldingly tend to bow outwardly the stretches of chain between the sprockets, so as to further the suppression of whipping action.

Another object of the invention is to provide a drive chain having an improved compensating joint construction in which the compensating spring elements serve the additional function of tying the parts of the chain together in assembled relationship, thus relieving the pintle element proper of this function and avoiding the distortion of the pintle element occurring as the result of the common practice of peening the ends of the pintle elements.

Other objects, the advantages and uses of the invention will become more apparent after reading the following specification and claims, and after consideration of the drawings forming a part of the specification, wherein:

Fig. 1 is a side elevation of a chain embodying my invention, parts being broken away and shown in section to better illustrate the construction;

Fig. 2 is a longitudinal sectional view through one of the joints of the chain, taken as indicated by the line 2—2 of Fig. 1;

Fig. 3 is an enlarged detailed sectional view of one end of a joint, taken as indicated by the line 3—3 of Fig. 1;

Fig. 4 is a perspective view of the compensating spring in its preferred form; and Fig. 5 is a perspective view of a somewhat modified form of the spring.

Fig. 6 is a perspective view of a strip of material that may be utilized in forming the compensating spring, a subsequent die-blanking operation on the strip being indicated in dotted lines;

Fig. 7 is a perspective view of a blank that has been formed and severed from the strip shown in Fig. 6;

Fig. 8 is a view of the spring blank, illustrating the operation of forming bowed regions therein and of holding the same to form a full elliptic spring.

As an example of one form in which the invention may be embodied, I have shown in the drawings a chain of the toothed belt type comprising a plurality of links A joined by pintle assemblies B. Each of the links A includes a back 10 and, at each end, a tooth 11 of conventional form, having outer and inner driving surfaces 12 and 13 respectively.

The pintles B each comprise a pair of opposed pintle sections 14 each having a semi-cylindrical exterior bearing surface 15 and a flat face 16, both extending the full length of the pintle sections. The flat faces 16 are disposed chordally with reference to the semi-cylindrical surfaces 15, being separated at the center of the pintle assembly, by a rectangular space in which is received the compensating spring means.

The spring means comprises a pair of bowed leaf spring sections 18, the respective end portions 19 of which are either in abutting contact or joined together, and the central regions of which are bowed away from each other as shown. The pintle assemblies B including the pintle sections 14 and spring sections 18, are threaded through openings 17 in the links A, said openings 17 providing cylindrical bearing surfaces conforming to the contour of the pintle surfaces 15. The end portions 19 are reduced to form shoulders 20 which are adapted to abut against a pair of washers 21 between which the links A are maintained in assembly. The reduced end portions 19 of the spring elements extend through openings 22 in the washers 21 and are peened as at 23 against the outer faces of the washers 21. Thus the spring serves as a tie link for connecting the parts together in assembly.

The washers 21 are disposed eccentrically with reference to the axis of the pintle assembly so as to cover the recesses 25 and the regions of the spring projecting thereinto.

The spring sections 18 may be formed either separately as shown in Fig. 5, or of a single strip of spring metal, bent back upon itself as at 26 in Fig. 4. In either event, the first step in forming the spring sections may be that of taking a ribbon of spring steel 27, shown in Fig. 6, and stamping notches 28 therein, as shown in Fig. 7, so as to form the reduced end portions 19 and shoulders 20. The strip may then be cut into lengths each including two of the spring sections 18, or in the single section length as indicated by the broken line 29.

In the next step, the blank may be formed to provide a bow in each of the sections 18, as shown in Fig. 8.

In the forming of the spring shown in Fig. 4, the double section of Fig. 7 is folded as indicated by the arrow 30 in Fig. 8 to bring the end portions of the blank into engagement with each other, thus forming the completed spring section shown in Fig. 4.

In the next operation, the formed spring may be tempered.

In the next operation, the spring elements are assembled with the pintle section 14, threaded through the openings 17, the washers 21 threaded over the reduced ends 19 thereof, and said ends 19 peened so as to enlarge them and thus lock the washers in place.

The central regions of the spring sections 18 are in engagement with the flat faces 16 of the pintle sections 14, while the end portions of the spring sections are out of contact with the pintle sections except when the spring sections are completely straightened out under chain tension. As a result of this arrangement, the straightening of the spring sections produces a rolling or rocking action of the bowed surfaces thereof against the flat faces 16 of the pintle sections, and there is no longitudinal sliding movement between the spring sections and the pintle sections. Thus wear between the spring sections and their cooperating bearing surfaces is eliminated.

The pintle sections 14 serve purely as bearing elements. They are not required to tie the washers 21 together as a result, they may be accurately machined from end to end and will remain free from any distortion that would occur as a result of peening their ends to secure retention against the outer surfaces of the washers. They are confined between the washers 21, the links A and the spring sections 18. Their combined area of bearing engagement is in the neighborhood of 240°, and they provide an equal amount of bearing engagement with each side of the apertures 17.

Each aperture 17 is extended toward the tip of the tooth 11 to form a recess 25. The spring sections 18 are of sufficient width to extend into the recesses 25. The width of the recesses 25 is greater than the distance between the outer faces of the spring sections, so as to permit a limited amount of oscillating movement of the spring sections therein. Thus the spring sections function by engagement with the extremities of the notches 25, to limit the amount of pivotal movement that the chain links may have relative to each other, and the notches are so placed that a normal amount of the hinging action necessary to wrap the chain around a sprocket, is permitted, while flexing of the chain in the reverse direction is restricted so that the stretches of chain between the sprocket may not flex inwardly substantially beyond a straight line. This is indicated in Fig. 1, in which the spring sections are shown in contact with those extremities of the notches which limit the reverse flexing of the chain.

This limiting of flexing assists in suppressing whipping action. Suppression of whipping action is further induced by the tendency of the spring sections, in bowing, to pivot the chain links toward the curved form necessary for wrapping around a sprocket.

The action of the spring sections in tending to pivot the adjacent chain links in the direction of sprocket wrapping has the additional advantage, where the slack stretch of the chain is the upper one, of preventing the stretch from sagging between the sockets and causing it to arch upwardly. This considerably decreases the total amount of pivotal movement between the links and thereby decreases wear.

Whipping is further inhibited by a braking action developed between the bearing surfaces 15 of the pintle sections and the coacting bearing surfaces of the openings 17. The total area of engagement between the pintle assembly and the links in the present invention is approximately 240°, whereas in prior compensating joints it does not exceed 180°. This not only increases the braking action between the pintle sections and the links, but also decreases wear between these parts.

In prior compensating joints, wear is aggravated by unseating of the pintle members as the joints thereof enter or leave a sprocket. This does not occur in a chain construction in accordance with my invention.

The main factor in the suppression of whipping, however, is the shortening of the pitch of the chain in the slack stretch.

This is accomplished by designing the chain so that the normal pitch thereof is obtained when there is sufficient tension in the chain to overcome the resistance of the spring sections and pull adjacent sets of chain links apart until the openings 17 are out of registry a distance corresponding to the amplitude of yield in the spring sections. As the chain approaches the slack side and is relieved of the load, the spring sections, which are exerting pressure against the now staggered bearing surfaces of the openings 17, will draw the links together so as to bring the openings 17 back toward positions of registry with each other, thus shortening the pitch of the chain and taking up slack so as to inhibit whipping.

I claim:

1. In a drive chain, a plurality of links having pintle apertures, a pintle comprising a pair of complementary sections having opposed arcuate bearing surfaces in engagement with opposite sides of said apertures, and spring means interposed between said sections and urging them apart, said spring means being of full elliptic form, with the central regions thereof bowed outwardly into engagement with the central regions of the pintle sections and the end portions of said spring means out of bearing engagement with said pintle sections, whereby straightening of the spring means under chain tension will develop a rolling and non-sliding engagement between the spring means and the pintle sections.

2. In a drive chain, a plurality of links having pintle apertures, a pintle comprising a pair of complementary sections having opposed arcuate bearing surfaces in engagement with opposite sides of said apertures, spring means interposed between said sections and uring them apart, and a plurality of washers to which the end portions of the spring means are secured, said spring means thus functioning to tie the washers together and thereby hold the links in assembled relationship, and said pintle sections terminating short of and being confined between the washers.

3. In a drive chain, a plurality of links having pintle apertures, a pintle comprising a pair of complementary sections having opposed arcuate bearing surfaces in engagement with opposite sides of said apertures, and spring means interposed between said sections and urging them apart, said spring means comprising a pair of opposed spring sections the central regions of which are bowed away from each other and in bearing engagement with the central regions of the pintle sections, the end portions of said spring sections being of reduced width, and a pair of washers for maintaining the chain links in assembled relationship, said reduced end portions of the spring sections being extended through said washers and having enlarged ends serving to lock the washers against said shoulders, said pintle sections terminating short of the inner surfaces of said washers, and being confined therebetween against longitudinal movement.

4. In a drive chain, a plurality of links having pintle apertures, a pintle comprising a pair of complementary sections having opposed bearing surfaces in engagement with opposite sides of said apertures, and leaf spring means interposed between said sections and urging them apart, said leaf spring means having reduced end portions separated from the body of the spring means by shoulders, and a pair of washers for maintaining the chain links in assembled relationship, said reduced end portions of the spring means being extended through said washers, and having enlarged ends serving to lock the washers against said shoulders, said pintle sections terminating short of the inner surfaces of said washers, and being confined therebetween against longitudinal movement.

5. In a drive chain, a plurality of links having pintle apertures, a pintle comprising a pair of complementary sections having opposed bearing surfaces in engagement with opposite sides of said apertures, and spring means interposed between said sections and urging them apart, said spring means being of full elliptic form, with the central regions thereof bowed outwardly into engagement with the central regions of the pintle sections and the end portions of said spring means out of bearing engagement with said pintle sections, whereby straightening of the springs under chain tension will develop a rolling and non-sliding engagement between the spring means and the pintle sections.

6. In a drive chain, a plurality of links having pintle apertures, a pintle comprising a pair of complementary sections having opposed bearing surfaces in engagement with opposite sides of said apertures, spring means interposed between said sections and urging them apart, and a plurality of washers to which the end portions of the spring means are secured, said spring means thus functioning to tie the washers together and thereby hold the links in assembled relationship, and said pintle sections terminating short of and being confined between the washers.

7. In a drive chain, a plurality of links having pintle apertures, a pintle comprising a pair of complementary sections having opposed bearing surfaces in engagement with opposite sides of said apertures, and spring means interposed between said sections and urging them apart, said spring means comprising a pair of opposed spring sections the central regions of which are bowed away from each other and in bearing engagement with the central regions of the pintle sections, the end portions of said spring sections being of reduced width, and a pair of washers for maintaining the chain links in assembled relationship, said reduced end portions of the spring sections being extended through said washers and having enlarged ends serving to lock the washers against said shoulders, said pintle sections terminating short of the inner surfaces of said washers, and being confined therebetween against longitudinal movement.

DAVID B. PERRY.